United States Patent [11] 3,567,028

[72] Inventor Yukihiko Nose
 Cleveland Heights, Ohio
[21] Appl. No. 787,054
[22] Filed Dec. 26, 1968
[45] Patented Mar. 2, 1971
[73] Assignee Research Corporation
 New York, N.Y.

[54] MEMBRANE ENVELOPE ASSEMBLY
 7 Claims, 12 Drawing Figs.
[52] U.S. Cl. ..................................................... 210/232,
 23/258.5, 210/321
[51] Int. Cl. ...................................................... B01d 31/00,
 B01d 13/00
[50] Field of Search .......................................... 210/22,
 321, 500, 490, 232, 233, 238; 23/258.5

[56] References Cited
UNITED STATES PATENTS
3,488,690 1/1970 Ross et al. ..................... 210/541X
3,490,523 1/1970 Esmond ........................ 23/258.5X Primary Examiner—Frank A. Spear, Jr.
Attorney—Stowell and Stowell ABSTRACT: A sterile, relatively inexpensive, disposable membrane envelope assembly is provided with the assembly consisting of a pair of spaced opposed extended surface membranes sealed together, a pair of porous reinforcing sheets at the obverse surfaces of the membranes adhesively secured to the membranes, and fluid inlet and outlet nipples mounted at opposite edges of the membranes to direct fluid flow between the opposed surface membranes. Membrane envelopes resulting from both total surface adherence of the reinforcing sheets to the membranes, and peripheral adherence of the reinforcing sheets to the membranes are disclosed.

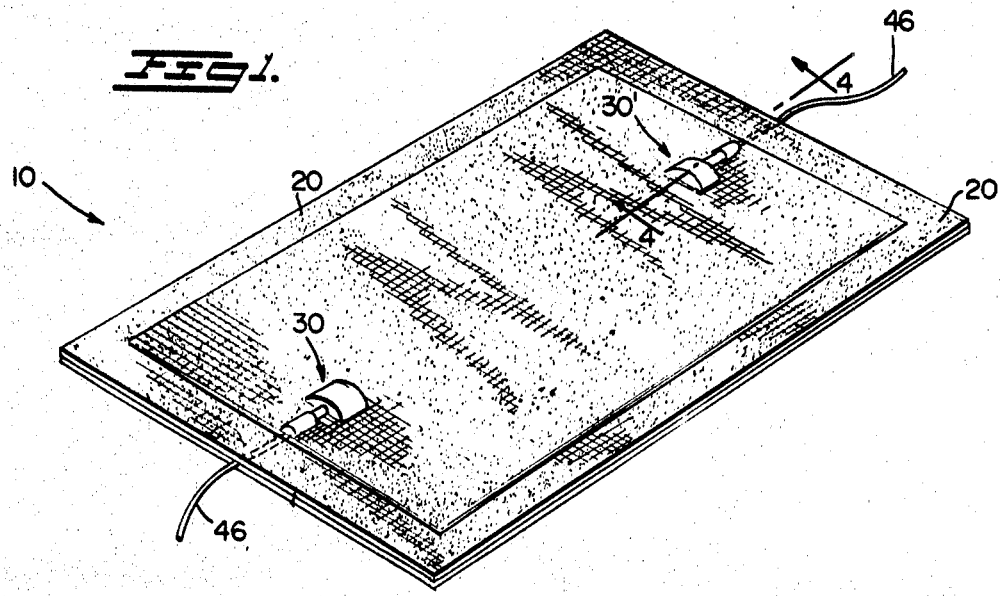
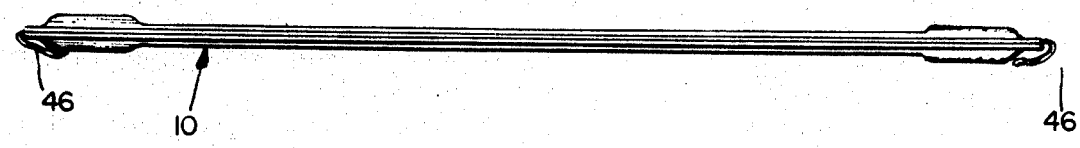
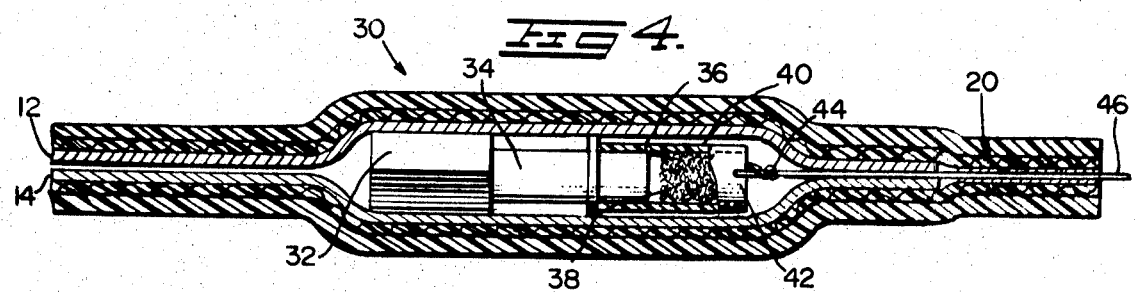

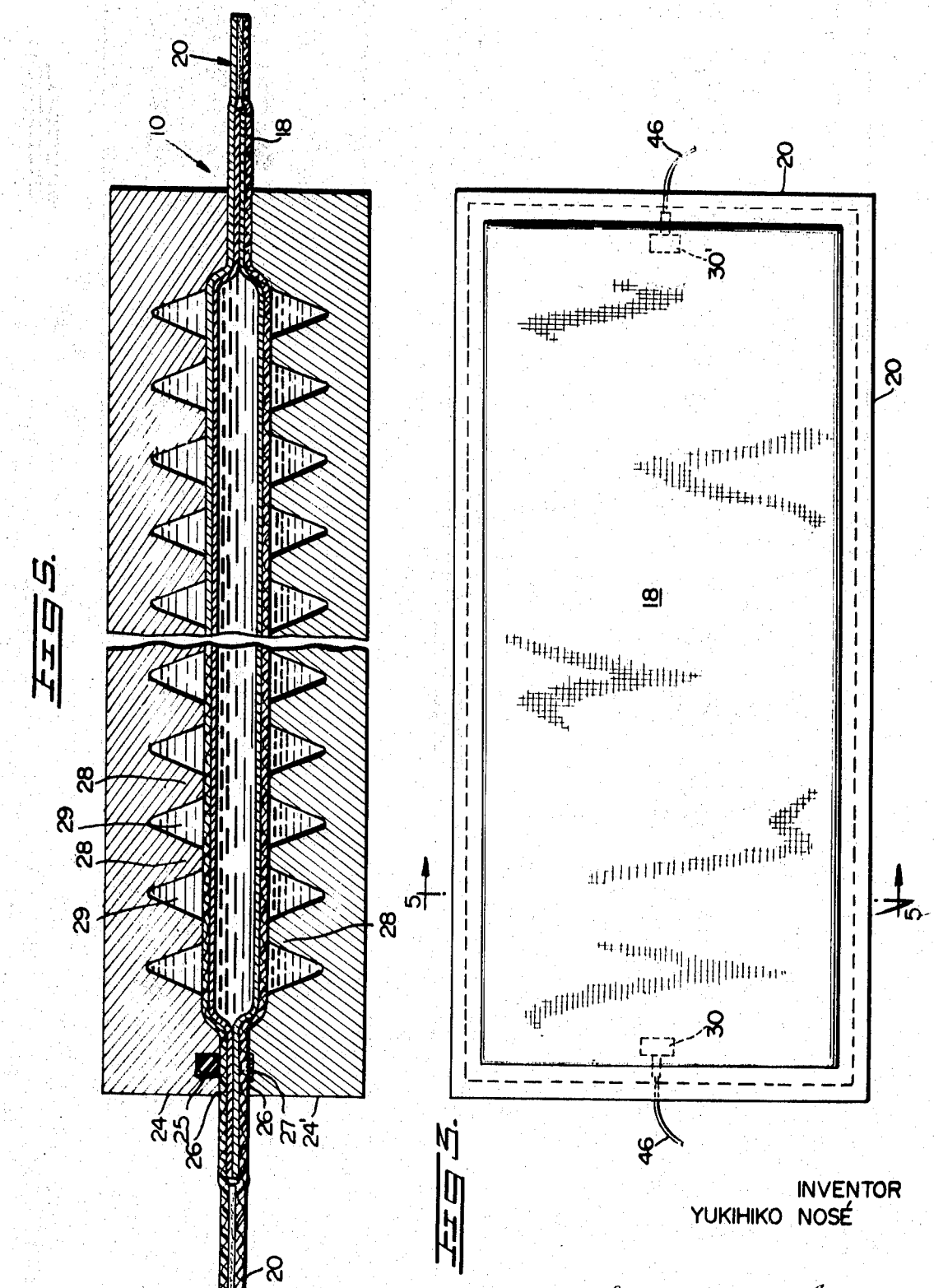

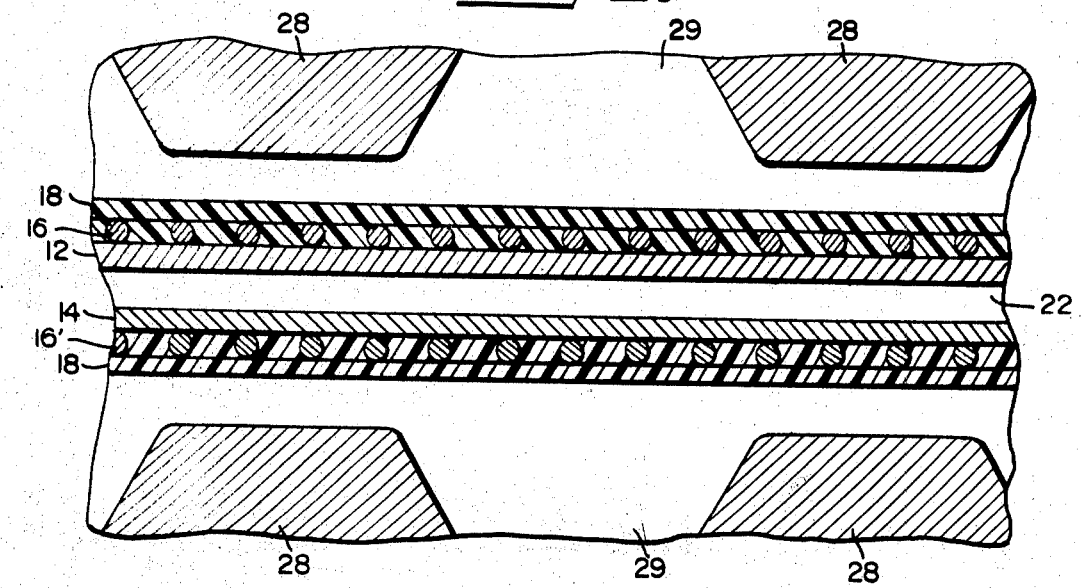
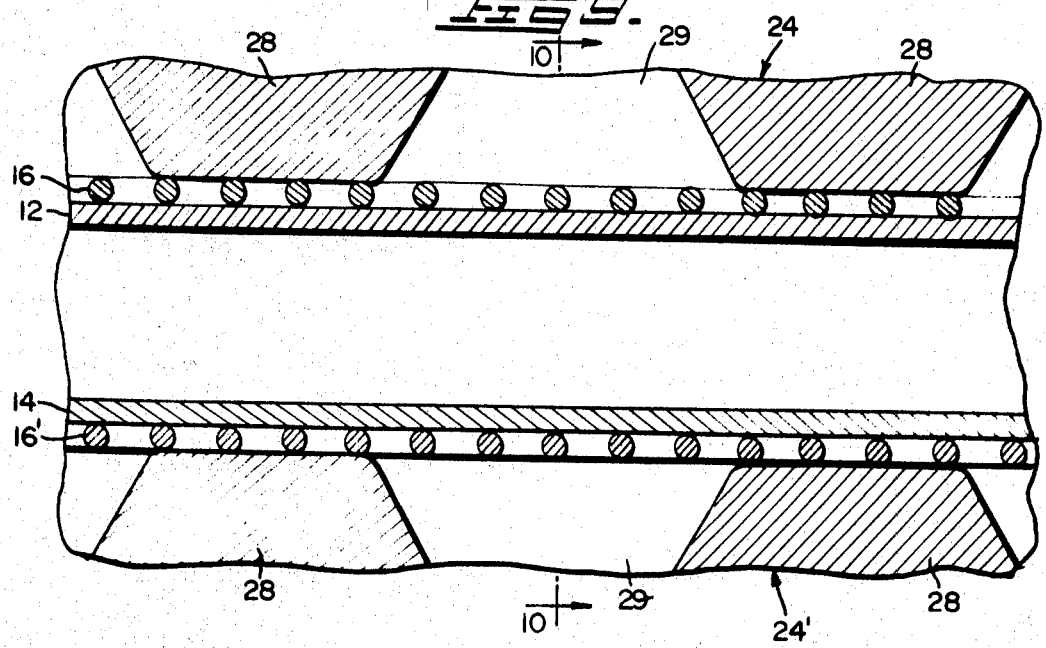

INVENTOR
YUKIHIKO NOSÉ

MEMBRANE ENVELOPE ASSEMBLY

This invention relates to a sterile, compact, disposable and relatively inexpensive membrane assembly. In one specific aspect, it relates a dialysis apparatus particularly useful in the dialysis of blood when employed in an artificial kidney device. In another specific aspect, it relates to a gas exchange apparatus useful in artificial lung devices.

An artificial kidney device contains a dialyzer interposed in the blood circulation of a patient whose kidneys are defective or inoperative. Blood circulates through the dialyzer which consists essentially of a semipermeable membrane, usually fabricated of cellulose, separating the blood from a suitable dialysate. A composite solution having about the same concentration of sodium, potassium, chloride, calcium, bicarbonate, magnesium and glucose as in normal plasma is usually employed as the dialysate. The solution is adjusted to and maintained at a pH of 7.4 by means of a bicarbonate, acetate and/or other physiologic buffer system. Glucose is sometimes added to adjust the osmolarity of the dialysate. The membrane is impermeable to the blood proteins but is permeable to nitrogenous waste products such as urea, uric acid and creatine. These waste products pass from the blood to the dialysate across the membrane with a minimum disruption of the other constituents normally present in circulating blood.

An artificial lung device contains a diffusion device similar in construction to the artificial kidney dialyzer interposed in the blood circulation of a patient whose normal respiration has been interrupted, for example, while undergoing heart surgery. Blood circulates through the device which consists essentially of a semipermeable member separating the blood from a suitable oxygen bearing gas or solution. The membrane is impermeable to liquid but allows carbon dioxide to pass from the blood and oxygen to pass to the blood. Membranes fabricated of a material such as polytetrafluorethylene or a silicone rubber are generally employed.

The rate of removal of waste products including carbon dioxide from the blood depends on the membrane surface area in contact with both the blood and the solution or gas on the other side of the membrane. In order to provide the large surface area of membrane per unit volume, particularly desirable in hemodialyzers, prior art dialyzers have wound the membrane in a generally spiral configuration or have employed membrane stacks with separators inserted between the membrane tubes or sheets.

In more recent years, the Kiil kidney or dialyzer has become increasingly popular for home dialysis. The kidney consists of three boards having longitudinal parallel grooves and two sheets of cuprophane membrane between each two boards. The space between each pair of membranes comprises the blood compartments; the dialysate compartments are located between each membrane sheet and its supporting board. Blood ports are positioned in each membrane pair at the end of the boards. The assembled kidney is held together by clamps and the membranes secured within the boards by means of gaskets.

The Kiil kidney must be cleaned and reassembled using fresh membranes before use. Thus, the home patient is faced with the rather time-consuming and tedious procedure of positioning the membrane sheets on the boards and leak-checking, sterilizing, flushing and priming the assembled kidney prior to each dialysis.

It is a principal object of the present invention to provide a relatively inexpensive disposable sterile membrane envelope assembly particularly suited for use in a Kiil kidney which does not require extensive positioning or further sterilization of the membranes prior to use.

It is another object of the invention to provide a more durable and, at the same time, more efficient membrane assembly for dialysis and gas exchange devices.

These and other objects and advantages of the present invention will become apparent on consideration of the membrane envelope assemblies more fully described in the following discussion and accompanying drawings, wherein:

FIG. 1 is a perspective view of a membrane envelope assembly according to the invention;

FIG. 2 is a side elevational view of the assembly illustrated in FIG. 1;

FIG. 3 is a top plan view of the structure illustrated in FIG. 1;

FIG. 4 is an enlarged, fragmentary, detailed sectional view on line 4-4 of FIG. 1 illustrating one of the nipple means of the assembly;

FIG. 5 is an enlarged, fragmentary, detailed sectional view on line 5-5 of the assembly illustrated in FIG. 3 assembly within a conventional Kiil board;

FIG. 8 is a greatly magnified view of a portion of the assembly in cooperation with a Kiil board shown in FIG. 5;

FIG. 9 is a view similar to that illustrated in FIG. 8 after dialysis has commenced and the dialysate soluble adhesive has been dissolved from about the porous reinforcing sheets;

Figure 6:
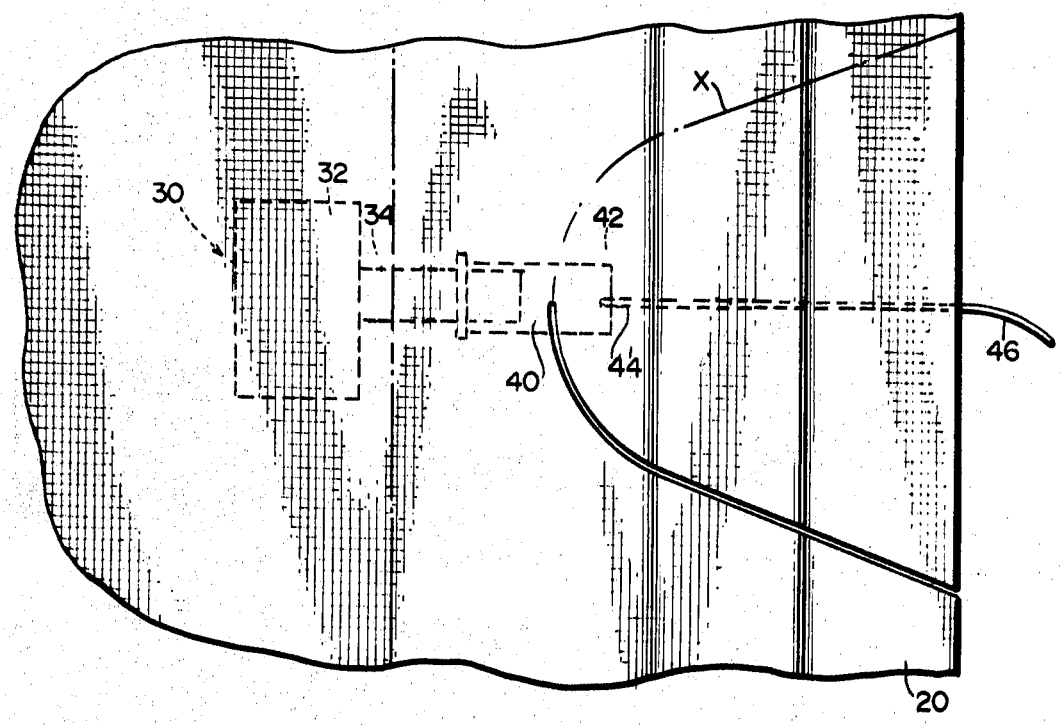
FIG. 6 is an enlarged, fragmentary, top plan view of the nipple means shown in FIG. 4 illustrating the procedure for gaining access to the nipple structure.
Figure 7:
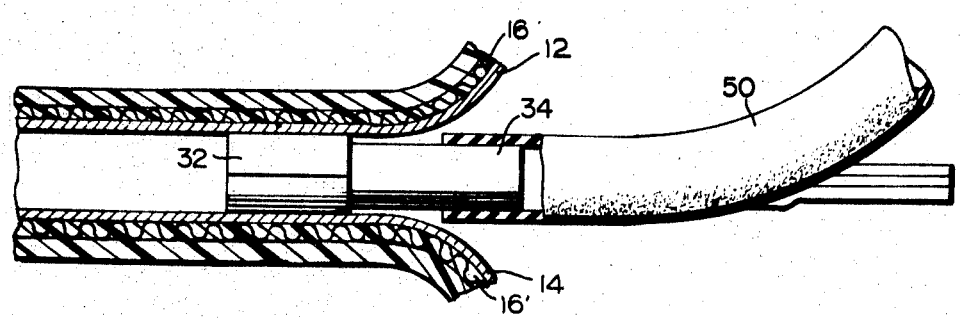
FIG. 7 is a view similar to FIG. 4 illustrating the nipple means connected to a blood flow conduit.

The present invention in its broadest aspect is a membrane envelope assembly comprising a pair of spaced opposed extended surface membranes sealed together, a pair of porous reinforcing sheets at the obverse surfaces of the membranes adhesively secured to the membranes, and fluid inlet and outlet nipple means mounted at opposite side edges of the membranes to direct fluid flow between the opposed faces of the membranes.

The rather thin membranes intended for dialysis or gas exchange are very weak and some degree of reinforcement greatly facilitates their handling and use. In the membrane envelope assembly of the present invention, each membrane is backed and supported by a porous reinforcing sheet such as a fine nylon multifilament woven screen. However, the porous reinforcing sheet may be paper, rayon, an open cell foam or formed from perforated nylon or polyester sheets, woven from polypropylene, nylon or polyester, or combinations of filaments composed of reinforcing sheet polypropylene and/or polyester, fiberglass, nonwoven cellulose, paper, rayon, etc. The primary requirements of the reinforcing sheet is that it be insoluable in the dialysate and have sufficient strength to provide a good backing or support for the thin membranes. It should be noted that the reinforcing sheet does not come in contact with the blood being dialyzed or subjected to gas exchange.

Contrary to what may be expected, the use of a porous reinforcing sheet actually increases the membrane area available for dialysis. The reinforcing sheet prevents the membrane filled with blood under pressure from stretching, increasing its blood volume and decreasing its effective area by adapting to the grooves of the Kiil board. In addition, the porous reinforcing sheet increases turbulent flow in the dialysate making dialysis even more efficient. A further unexpected advantage resulting from the presence of the reinforcing sheet is that the grooves in the Kiil need not be as accurately machined as heretofore.

The membrane envelope assembly generally designated 10 is illustrated in FIGS. 1—10. The assembly comprises a pair of spaced opposed membranes 12 and 14 similar in size and composition. The membranes may comprise any conventional membrane material suitable for the particular intended function of a dialysis or gas exchange device. The presterilized membrane pair is sealed about its edges and the internal surfaces of the membranes are protected from exposure during storage and subsequent assembly of a kidney or lung device.

The internal surfaces which would come in contact with a patient's blood remain in a sterile condition and sterilization by the patient prior to dialysis is not required.

In the method employing total surface adherence, each of the pair of porous reinforcing sheets 16 and 16' is secured to the back or obverse surface of its membrane by a dialysate-soluble adhesive. Where the device is to be employed as an artificial kidney, the water-soluble bonding agent or adhesive may comprise methyl cellulose; starch adhesive dextran, polyvinylpyrrolidone or combinations thereof have also been successfully employed as the adhesive means. The adhesive, generally illustrated as 18 in FIG. 8, fills the interstices between the mesh of the supporting sheets and provides a desirable stiffening layer for the entire assembly. During application of the adhesive containing solution, the thus wetted membranes are prestretched further increasing their resultant dialysis capabilities. The nipple or flow control inlet and outlet means are placed within the assembly as to be more fully described in reference to FIGS. 4, 6 and 7.

In making the membrane envelope assembly, the porous reinforcing sheets 16 and 16' are dimensioned to be greater than the dimensions of the membranes 12 and 14 to provide marginal edge portions 20 surrounding the assembly. The marginal edge portions are adhesively connected by the adhesive employed to bond the reinforcing sheets to the obverse faces of the membranes thereby providing a sealed envelope having an internal passage 22 between the membranes 12 and 14.

The overall dimensions of the membrane envelope assembly are such that the completed assembly is greater in surface extent than the pair of Kiil boards 24 and 24' intended to receive it. It will be seen from FIG. 5 that the Kiil boards have marginal edge portions 26 which clamp the envelope assembly therebetween and prevent the liquid to be dialyzed and the dialysate from weeping laterally outwardly of the assembly and to prevent dissolving the dialysate soluble adhesive form such marginal zones. Sealing is effected by O-ring 25 and may be facilitated by the presence of a paint-on gasket 27 on the assembly approximating the gasket.

The Kiil boards 24 and 24' are provided with a plurality of longitudinal parallel grooves 29 through which the dialysate flows during operation of the device. The resultant ridges 28 support the external or outer surfaces of the dialyzer assembly as more clearly illustrated in FIGS. 5, 8 and 9.

Referring particularly to FIGS. 1, 4, 6 and 7, flow of the fluid to be dialyzed within the assembly is provided by a pair of nipple assemblies 30 and 30' which are identical in construction. The nipple assembly 30 comprises a distributor block 32, ovoidal in transverse section, integral with a cylindrical conduit member 34. An end 40 of resilient sleeve 36 is plugged with a wadding such as absorbent cotton 38. The outlet opening of the conduit 34 is sealed by placing the resilient sleeve, with cotton wadding in place, over the conduit, fixing at the outermost end 42 of sleeve 36 a suitable string, tape, or semirigid access member 44, the extended end of which projects outwardly of one of the marginal edges 20 of the assembly. With this subassembly in place, the adhesive is applied and the lamination is completed thus anchoring the nipples in their illustrated position. Following lamination, the exposed surfaces may be marked or perforated as illustrated by line X in FIG. 6 to facilitate removal of a portion of the envelope assembly when the cylindrical conduits 34 are to be connected to suitable flexible tubing 50 in connection with the material to be dialyzed.

The complete sealing of the membrane envelope assembly inherent in its fabrication guarantees that the unit is maintained in a fully sterile condition In assembling the Kiil kidney, the two membrane envelope assemblies are removed from their package and the operator or patient positions the assemblies within the Kiil boards and then positions the blood ports using the extended ends 46 of access members 44. The boards are then clamped tightly about their marginal edges employing conventional Kiil board clamps. Following clamping and immobilizing of the dialyzer assembly, the operator cuts about the line X to expose a portion of the resilient protective sleeve 36 and carefully removes the cotton plug 38 and the remaining portion of the sleeve. To the extended end of the conduit 34 one of the pair of tubes 50 is connected. A similar procedure is followed at the opposite nipple 30' and following connection to the dialysate the kidney is ready for operation.

Figure 10:
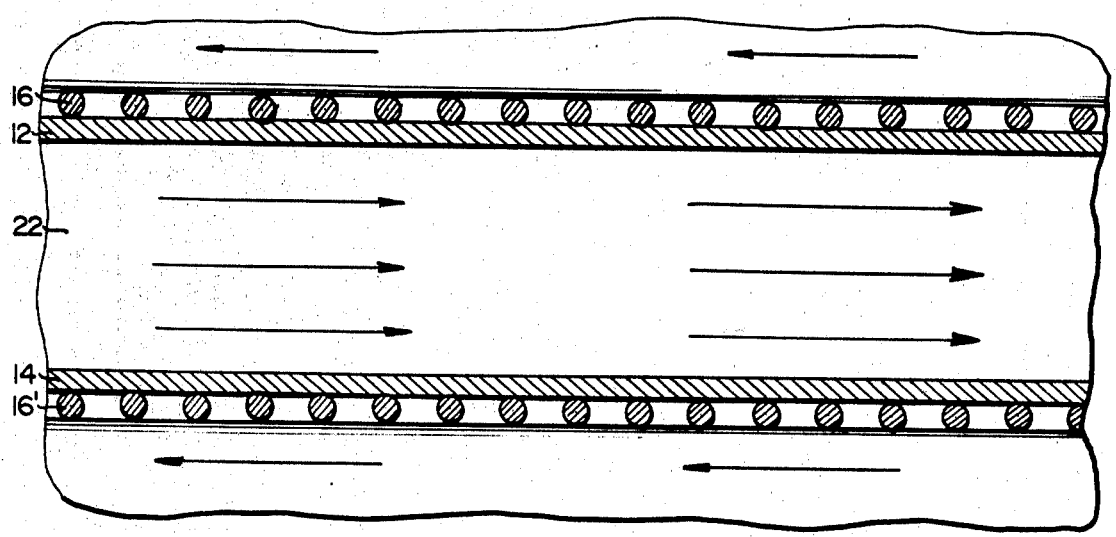
FIG. 10 is a fragmentary sectional view on line 10-10 of FIG. 9 illustrating the flow paths for blood and dialysate.

The initial flow of dialysate, for example, after about 20 minutes at the rate of 500 ml. per minute, dissolves the adhesive releasing the membranes from their attachment to the porous reinforcing sheets 16 and 16' as diagrammatically illustrated in FIGS. 8 and 9. The adhesive, being a relatively high molecular weight polymer, does not pass through the membrane into the blood being dialyzed. Freeing the membranes increases their effective area available for dialysis without materially reducing the supporting effect of the porous reinforcing sheets. Due to the pressure of the blood within the envelope, the membranes 12 and 14 and the now free supporting sheets 16 and 16' expand outwardly so that the supporting ridges 28 of the Kiil board are in intimate contact with the outer surfaces of selected portions of the supporting sheets as illustrated in FIG. 9. However, dialysate is still capable of rinsing through the pores of the reinforcing sheet. The overall flow path for the blood between membranes 12 and 14 and that for the dialysate exterior to these membranes is illustrated in FIG. 10.

Figure 11:
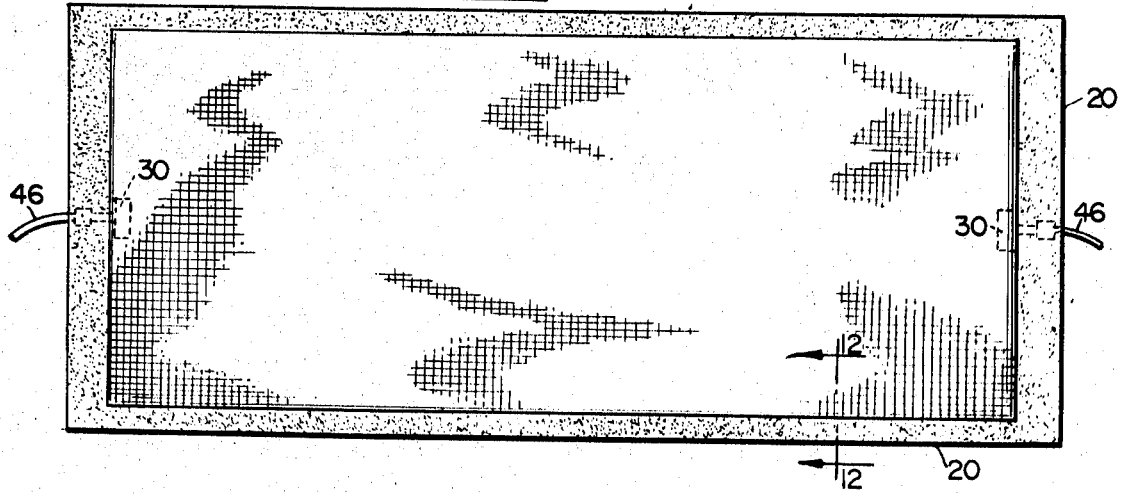
FIG. 11 is a top plan view similar to that of FIG. 3 but of another membrane envelope assembly of the invention.
Figure 12:
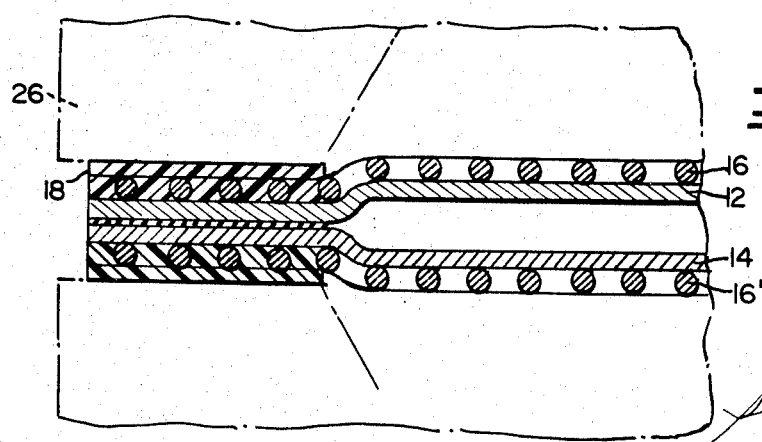
FIG. 12 is an enlarged, fragmentary, detailed sectional view along line 12-12 of FIG. 11 illustrating edge structure of the assembly.

A second membrane envelope assembly utilizes a peripheral adherence concept wherein the membranes are initially adhered only about their edge portions 20 is shown in FIGS. 11 and 12. The membranes 12 and 14 are first adhesively sealed together along their long edges and the reinforcing sheets 16 and 16' adhesively secured to the corresponding obverse edges of the membranes. The adhesive employed need not be water-soluble. The laminate subassembly is made or cut to the desired length and the nipple means 30 and 30' inserted at the ends thereof. The nipple means, the remaining edges of the membrane pair and the remaining edges of the porous reinforcing sheets are adhesively sealed and secured to complete the assembly. The assembly is used in conjunction with the Kiil kidney substantially as hereinabove described for the envelope assembly designated 10 but without the necessity of first dissolving adhesive to liberate the porous reinforcing sheets.

While a preferred form of the present invention has been disclosed and shown herein will be recognized by those skilled in the art that various modifications may be made in the illustrated example without departing from the scope of the appended claims. For example, while in the illustrated form of the invention the blood inlet and outlet nipples 30 and 30' are positioned between the opposed surfaces of the dialyzer membranes by securing their respective extensions, 40, or 44, to the membranes by the dialysate-soluble adhesive, nonsoluble adhesive means may be employed to anchor the nipples and/or mechanical attaching means may be employed to immobilize the nipples within the envelope.

I claim:

1. A sterile membrane envelope assembly comprising a pair of spaced opposed extended surface membranes, a pair of dialysate-insoluble reinforcing sheets having peripheral dimensions greater than said membranes, dialysate-soluble adhesive means securing said reinforcing sheets to the outer surfaces of said membranes and to each other in marginal zones outwardly of the peripheral margins of the membranes, and fluid inlet and outlet nipples mounted at opposite side edges of said membranes to direct fluid flow between the opposed faces of the membranes.

2. The invention defined in claim 1 wherein inlet and outlet nipples are sealed inwardly of the margins of the dialyzer assembly and the outer ends thereof are removed by piercing the assembly prior to use of the dialyzer.

3. The invention defined in claim 2 wherein the inlet and outlet nipples are each provided with a string, tape or semirigid access member extending beyond the outer margins of the assembly.

4. The invention defined in claim 1 provided with a gasket exterior to the sealed edges.

5. A sterile membrane envelope assembly comprising a pair of spaced opposed extended surface membranes adhesively sealed together at their edges, a pair of porous reinforcing sheets at the obverse surfaces of the membranes adhesively secured to the edges of the membranes, and fluid inlet and outlet nipple means mounted at opposite side edges of the membranes to direct fluid flow between the opposed faces of the membranes, wherein said inlet and outlet nipple means are located inwardly of the margins of the dialyzer assembly and the outer ends thereof are removed by piercing the assembly prior to use of the dialyzer.

6. The invention defined in claim 5 wherein the inlet and outlet nipple means are each provided with a string, tape, or semirigid access member extending beyond the outer margins of the assembly.

7. The invention defined in claim 5 provided with a gasket exterior to the sealed edges.